US009205809B2

(12) United States Patent
Becker

(10) Patent No.: US 9,205,809 B2
(45) Date of Patent: Dec. 8, 2015

(54) VEHICLE UNIT AND METHOD FOR OPERATING THE VEHICLE UNIT

(75) Inventor: Bernd Becker, Blaustein (DE)

(73) Assignee: Continental Automotive GmbH, Hannover (DE)

( * ) Notice: Subject to any disclaimer, the term of this patent is extended or adjusted under 35 U.S.C. 154(b) by 92 days.

(21) Appl. No.: 14/129,018

(22) PCT Filed: Jun. 25, 2012

(86) PCT No.: PCT/EP2012/062203
§ 371 (c)(1),
(2), (4) Date: Dec. 23, 2013

(87) PCT Pub. No.: WO2013/000854
PCT Pub. Date: Jan. 3, 2013

(65) Prior Publication Data
US 2014/0142781 A1    May 22, 2014

(30) Foreign Application Priority Data
Jun. 30, 2011    (DE) .......................... 10 2011 106 078

(51) Int. Cl.
*G06F 12/00*    (2006.01)
*B60R 99/00*    (2009.01)
*G06F 21/74*    (2013.01)

(52) U.S. Cl.
CPC ................ *B60R 99/00* (2013.01); *G06F 12/00* (2013.01); *G06F 21/74* (2013.01)

(58) Field of Classification Search
CPC .......... G06F 12/00; G06F 21/74; B60R 99/00
See application file for complete search history.

(56) References Cited

U.S. PATENT DOCUMENTS

| 7,877,357 B1* | 1/2011 | Wu et al. .................. 707/639 |
| 2008/0016313 A1* | 1/2008 | Murotake et al. ............. 711/173 |
| 2009/0217136 A1 | 8/2009 | Cheng et al. |
| 2010/0292867 A1 | 11/2010 | Böhm et al. |

FOREIGN PATENT DOCUMENTS

| DE | 10 2007 040094 | 2/2009 |
| WO | WO 2009/080015 A2 | 2/2009 |

OTHER PUBLICATIONS

Nilsson et al., "A Framework for Self-Verification of Firmware Updates over the Air in Vehicle ECUs.", Inc: Proc.2008, Globecom Workshops pates 1-5.

* cited by examiner

*Primary Examiner* — John Q Nguyen
*Assistant Examiner* — Michael Kerrigan
(74) *Attorney, Agent, or Firm* — Cozen O'Connor

(57) ABSTRACT

A vehicle unit and a method are provided for controlling vehicle functions with a microprocessor and connected memory, on which a main operating system, which forms the hardware interface for application programs, and user interactions are implemented. The microprocessor is configured in a microkernel architecture with separate partitions for a main operating system unit, a cryptographic unit and a supervision unit. The main operating system is set up in the main operating system unit, and software certificates are stored in the cryptographic unit and a verification program for verifying certificates and software packages is set up therein. A monitoring program that monitors the operation of the other partitions of the microkernel architecture is provided in the supervision unit.

12 Claims, 2 Drawing Sheets

VEHICLE UNIT AND METHOD FOR OPERATING THE VEHICLE UNIT

CROSS-REFERENCE TO RELATED APPLICATIONS

This is a U.S. national stage of application No. PCT/EP2012/062203, filed on 25 Jun. 2012, which claims priority to the German Application No. 10 2011 106 078.6, filed 30 Jun. 2011, the content of both incorporated herein by reference.

BACKGROUND OF THE INVENTION

1. Field of the Invention

The invention relates to a vehicle unit for controlling vehicle functions, for example a central vehicle control unit, a multimedia vehicle unit or the like, and to a method for operating this vehicle unit. As customary, the vehicle unit has a microprocessor with a connected memory, a main operating system (OS) being implemented on the microprocessor. According to the invention, the main operating system forms the interface between the hardware of the vehicle control unit and application programs (applications) implemented in the main system and/or possibly also additionally implemented on the microprocessor and user interactions via a user interface.

2. Related Art

Such electronic vehicle units are being increasingly used in vehicles, with application programs which are controlled by user inputs or hardware components connected to the vehicle Unit or both being installed on the vehicle units. Such open systems are likely to result in the main operating system and/or application programs on the vehicle unit no longer operating under certain conditions, for example on account of errors when writing to the memory connected in the vehicle unit. Such problems may arise in the case of too many roll-back memory accesses to earlier memory entries or during program addition or deletion actions. It is then often necessary to reinstall the main operating system and possibly the application programs. This reinstallation is very complicated for original equipment manufacturers, intermediaries and end customers because the vehicle unit must be removed from the vehicle and sent to a repair service which must then rewrite the memory in a process which is also referred to as "flashing" in order to reimplement the main operating system and possibly the application programs on the microprocessor.

SUMMARY OF THE INVENTION

Since the above-described method is very labor-intensive and cost-intensive, the object of the present invention is to reduce the number of situations in which the repair described above must be carried out by removing the vehicle unit and sending it to a repair service.

This object is achieved by a vehicle unit and a method for operating the vehicle unit. In a vehicle unit of the type described at the outset, provision is made for the microprocessor to be set up in a microkernel architecture with separate partitions for a main operating system unit, a cryptographic unit and a supervision unit, the main operating system and possibly application programs being set up in the main operating system unit, software certificates being stored in the cryptographic unit and a verification program for verifying certificates and software packages being set up in the cryptographic unit, and a monitoring program for monitoring the functions of the other partitions of the microkernel architecture being provided in the supervision unit.

According to aspect of the invention, the separate partitions with the programs set up thereon operate independently of one another, the monitoring program in the supervision unit monitoring the functions of the other partitions and preferably initiating a repair process if an error is detected, for example by rewriting the defective partition in the microkernel architecture. Such a flash process is used to repair the system by returning the system to the last-known stable state.

Therefore, providing the microkernel architecture having the separate partitions makes it possible, according to an aspect of the invention, to also use the supervision unit when the main operating system unit is defective, with the result that the supervision unit can repair the entire system, which conventionally had to be carried out by connecting a corresponding repair system in a repair service. In this case, the monitoring program in the supervision unit may be implemented, for example, in the form of a type of watchdog function, in particular for the main operating system unit. According to the invention, the entire microkernel architecture is preferably implemented on precisely one microprocessor on which all units of the different partitions are therefore set up and on which all functions allocated to the different units run by implementing suitable programs.

According to an aspect of the invention, the partition with the main operating system unit may be set up to be able to be changed by an end user, for example by downloading and installing new application programs and/or firmware programs. Firmware programs may also comprise, in particular, new versions of the main operating system.

In this case, it is possible, according to as aspect of the invention, to both install updates and to completely rewrite the partition (flashing), the main operating system being reinstalled in the vehicle unit. This is a possible way of changing the vehicle unit to a functional state again in the event of a software error.

According to one particularly advantageous aspect of the present invention, further partitions of the microkernel architecture in the microprocessor may be set up so that they cannot be changed by the end user. This may preferably concern all further partitions of the microkernel architecture, but particularly the cryptographic unit and the supervision unit or the respective partitions with the cryptographic unit and the supervision unit. This makes it possible to achieve, overall, a high degree of system reliability with simultaneous influence on the main operating system unit by the user, since the partitions and units of the microkernel architecture which are responsible for possibly recovering the main operating system cannot be changed by user interventions and therefore make it possible to restore the vehicle unit to a predetermined, defined status.

In a further development of the concept according to an aspect of the invention, the cryptographic unit may be set up to decrypt and/or verify software to be installed in the vehicle unit in packages using the verification program. This solves the problem of the memory connected to the microprocessor in the vehicle units, in particular a flash memory, having only a comparatively small storage space capacity which is often not sufficient to buffer complete applications. This also applies, for example, to a complete image of the partition with the main operating system.

In this context, US 2009/0217136 A1 has already described a storage device with a flash storage module and a controller contained in the storage device and having its own microprocessor with an error correction module that carries out a correction in packages when storing or reading data from the flash storage module. However, US 2009/0217136 A1 proposes an independent microprocessor for this purpose, which is permanently assigned to the storage unit, the storage unit itself being able to be connected to a host computer system. In contrast, implementing this function within the scope of a microkernel architecture in accordance with the present invention provides the advantage that a single microprocessor can be used because the cryptographic unit according to the invention within the scope of the microkernel architecture is also in the form of a partition, which cannot be changed from the outside, and is therefore protected from unwanted or deliberate manipulation and operates in a particularly reliable manner when decrypting and verifying the main operating system and/or application software. Within the scope of this proposed architecture, it is not necessary to provide a separate processor and a controller for this purpose.

The supervision unit, which is particularly important according to an aspect of the invention, is advantageously set up to initiate a recovery method for the partitions with the main operating system, in the event of an error in the main operating system, using the monitoring program. The vehicle operating unit can be operated in a particularly safe and reliable manner by virtue of this being carried out automatically in the event of an error being detected in the main operating system of the vehicle unit.

According to one simple variant, according to an aspect of the present invention, the basic version of a functioning main operating system can be stored in the flash memory connected to the vehicle unit together with the important application programs, for example in the form of an image which is written back by the supervision unit as a backup image of the partition for the main operating system.

Alternatively or additionally, a preferably user-interactive download of a current main operating system version can take place during the recovery method, which version is then installed by the supervision unit in the partition for the main operating system unit. The integrity of the installed software can be verified by the cryptographic unit in this case before or during installation.

In order to make it possible to easily transmit a current main operating system version or current application programs, the vehicle unit may have an interface for an external storage medium, which interface can also be controlled by the supervision unit. This interface may be, for example, a USB interface, an interface for the insertion of a secure digital card (SD card), another data card or the like. In this case, the interface need not be directly provided on the vehicle unit, but rather may also be integrated, according to the invention, in a user interface which is present in the vehicle anyway.

The supervision unit or the monitoring program implemented in the latter preferably has an emergency operating system which is set up to control required user interfaces, for example a display, an input unit and the like, and interfaces for an external storage medium and to carry out the recovery method.

According to one particularly preferred embodiment, according to an aspect of the present invention, the microkernel architecture may be in the form of a so-called separation kernel with a separate partition for a policy unit, the policy unit being set up to monitor and possibly control communication between the individual partitions of the microkernel architecture. For example, the policy unit prevents the main operating system from accessing the other partitions and controls communication processes between the individual partitions. This achieves a particularly high degree of operational reliability and protection against manipulation of the vehicle unit because the policy unit which likewise cannot be changed by the user cannot carry out any unforeseen actions within the memory connected to the microprocessor or within the microprocessor itself.

The vehicle unit and the respective units in the different partitions of the microkernel architecture are set up, according to an aspect of the invention, to carry out the method described below for operating the vehicle unit or parts of the latter. This method is used to operate a vehicle unit with a microprocessor on which the above-described microkernel architecture with the separate partitions for a main operating system unit, a cryptographic unit and a supervision unit has been set up. According to an aspect of the invention, the main operating system and possibly application programs are set up in the main operating system unit. These can be changed by the user. According to an aspect of the invention, software certificates are stored in the cryptographic unit and a verification program for verifying certificates and complete software packages is set up in the cryptographic unit. According to an aspect of the invention, a monitoring program for monitoring the functions of the other partitions of the microkernel architecture is provided in the supervision unit, the monitoring program in the supervision unit monitoring the main operating system and application software which is possibly present during starting and/or operation of the main operating system or the vehicle unit and initiating a recovery method for the main operating system in the event of deviations from a predefined behavior. This makes it possible to restart the vehicle unit in many cases in the event of a failure and to restore the vehicle unit to an operational state without the need to remove the vehicle unit and rewrite the memory connected to the microprocessor in order to reimplement the main operating system software and the application programs.

In one particularly advantageous refinement of the method according to an aspect of the invention, in order to determine deviations during starting and/or operation of the main operating system, a typical start time for a user interface (Human Machine Interface—HMI), the computation time of the microprocessor used by the main operating system and/or the storage space requirement used by the main operating system is/are monitored, for example by comparison with predefined limit values for normal operation. Such data can be easily monitored by the monitoring program in a type of watchdog function by simulating and checking a response of the user interface, for example, and monitoring the operation of the microprocessor and the storage space. This is readily possible within the scope of an independent process in the supervision unit without possible errors in the partition for the main operating system unit impairing this function.

If the recovery method is started if incorrect operation of the partition with the main operating system unit is detected, during this recovery method, the partition with the main operating system unit can be preferably switched off completely and can be unloaded from the microkernel architecture. According to an aspect of the invention, the emergency operating system in the supervision unit then controls the user interface and/or an interface for the external storage medium in order to indicate the failure of the vehicle unit and to be able to reimplement the main operating system unit in the corresponding partition of the microkernel architecture. The recovery method according to the invention can then be carried out in an automated and/or user-controlled manner. The defective partition can be automatically recovered in a particularly fast manner when, in the method according to an aspect of the invention, a backup image of the partition for the main operating system stored in the vehicle unit, for example in the memory connected to the microprocessor, is written back. After such a backup image has been written back, the vehicle unit can be restarted, the reinstalled main operating system being executed during restarting.

Alternatively, during the recovery method, a user-interactive download of a current main operating system version can be carried out, the current main operating system version being read in, in particular via an external storage medium, and being installed in the partition for the main operating system.

According to the invention, a serial number, a version identification number or the like can be output to the user in this respect in order to make it possible for the user to select the appropriate main operating system, that is to say suitable firmware, from a manufacturer's page on the Internet. In a modification of this additionally provided information, a suitable Internet link, in particular in the form of a HTML file, may also be output on the external storage medium, which, after being connected to another computer system with an Internet connection, can be directly called and results in the suitable main operating system being downloaded. The HTML file, possibly with JavaScript portions, checks the size of the storage medium and stores an image file and/or an update file with the main operating system to be installed in a suitable directory. This reduces errors because defective installation of an incorrect operating system is avoided from the outset without the cryptographic unit installed in the vehicle unit having to accordingly intervene. If necessary, a certificate can also be used in this case.

Nevertheless, it is particularly advantageous if the cryptographic unit carries out a check before or during the installation of the main operating system and/or an application which is suitable for the main operating system and is in the form of an application program. In this case, the serial number, hardware version, integrity, certificate or the like may be checked and decryption may possibly also be carried out.

According to an aspect of the invention, after writing an Internet link, for example in the form of the HTML file, it is possible to switch to an automatic start-up mode which checks the presence of an external storage medium containing the image file and/or the update file during starting of the vehicle unit and immediately starts the installation thereof if present. Otherwise, the presence of the external memory is not checked. This also ensures that an update with the same software version is not repeatedly carried out, which may result in an unstable system under certain circumstances. After successful reinstallation of the main operating system (also called flashing), a switch is then made again to the normal and usually also faster starting mode.

Finally, in another aspect, the present invention also relates to a computer program product having program code, stored in a non-transitory computer-readable medium, for being executed by a computation unit, such that, during execution of the computer program, the program code sets up a microkernel architecture as described herein.

BRIEF DESCRIPTION OF THE DRAWINGS

Further advantages, features and possible uses of the present invention emerge from the following description of an exemplary embodiment and the drawings. In this case, all features described and/or shown in the figures form the subject matter of the present invention on their own or in any desired combination, including independently of their combination in the claims or the dependency references therein. In the drawings:

DETAILED DESCRIPTION OF THE PRESENTLY PREFERRED EMBODIMENTS

Figure 1:
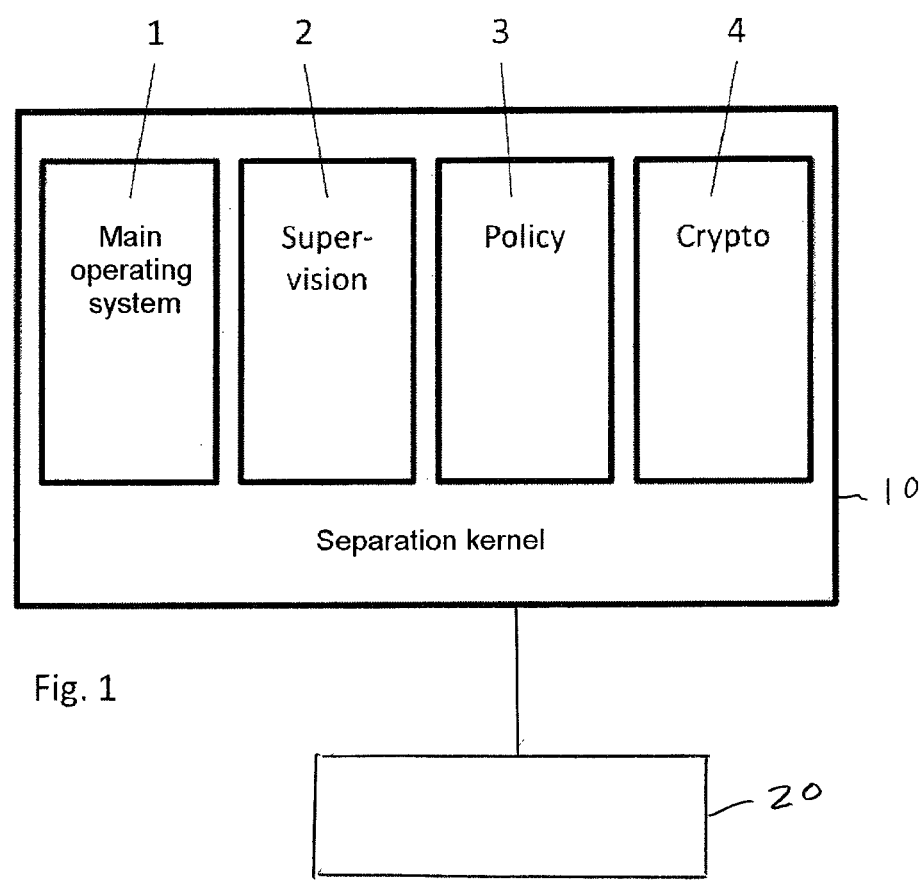
FIG. 1: schematically shows the structure of a microkernel architecture according to the invention.

In this respect, FIG. 1 illustrates the system partitioning of a memory 10 connected to the microprocessor 20 which is accessed by the memory 10 for the purpose of executing the various programs in the partitions. This partition is in the form of a separation kernel which is a special variant of a microkernel architecture. In the microkernel architecture, the different partitions 1, 2, 3, 4 for the main operating system unit, the supervision unit, the policy unit and the cryptographic unit are implemented on the same microprocessor with a connected memory, the different partitions being able to run independently of one another on the microprocessor and also being able to be executed in a parallel manner.

The main operating system of the vehicle unit, which can be changed by the end user, for example by downloading and installing new application programs or new main operating system software versions, is installed in partition 1 for the main operating system unit.

Partition 4 with the cryptographic unit is responsible for storing and validating certificates and verifying the certificates of application software or complete software packages. All software certificates are installed inside the partitions 4 with the cryptographic unit without the other partitions 1, 2, 3 having access to partition 4. This increases security according to the invention because the cryptographic unit cannot be changed by the user.

Partition 2 with the supervision unit monitors the other partitions 1, 3, 4, and in particular partition 1 with the main operating system unit responsible for the correct operation of the vehicle unit, using watchdog-like mechanisms, for example.

According to the invention, this unit is therefore responsible for detecting a non-functional main operating system and initiating an automatic or user-interactive recovery process.

Partition 3 with the policy unit is a standard unit of a separation kernel and monitors or controls communication between the different partitions 1, 2, 4. For example, a check is carried out in order to determine whether a partition A can send a message M to a partition B. The policy unit also controls the access rights to physical memory areas or flash partitions and changes the budgets for allocating processor power to individual processes or allocating storage space.

An important concept of the present invention now lies in moving the program code responsible for monitoring and recovering the entire vehicle unit from partition 1 with the main operating system unit to partition 2 with the supervision unit, this partition 2 being protected from influence or access from partition 1 by the microkernel architecture while it nevertheless runs on the same microprocessor.

With this function, the monitoring function is also transferred from an external microcontroller usually provided for this purpose to partition 2 for the supervision unit which interacts with the policy unit and the cryptographic unit during its tasks.

All of these units in partitions 2, 3 and 4 cannot be changed by software updates or user interventions, with the result that the units are invariably fixed from the moment the vehicle unit is produced. This makes it possible to control recovery of the partitions 1 with the main operating system in a predictable manner. The interaction between the supervision unit, the cryptographic unit and the policy unit within the separation kernel in the microkernel architecture therefore ensures that only the flash partitions which are assigned to the main operating system unit in partition 1, and can be changed by downloadable application programs or new firmware versions, are overwritten. At the same time, the policy unit in partition 3 prevents the main operating system unit from accessing the other partitions 2, 3 and 4. According to the invention, instead of the three different partitions 2, 3 and 4, the supervision unit, the cryptographic unit and the policy unit may also be combined in a common partition which, however, is different from partition 1 for the main operating system unit.

This can make it possible to save memory and improve the runtime performance by more optimum scheduling for the microkernel.

The process for detecting errors in the main operating system unit and for recovering the main operating system unit, which is described below, can be reliably implemented inside this microkernel architecture, as illustrated in FIG. 1.

Figure 2:
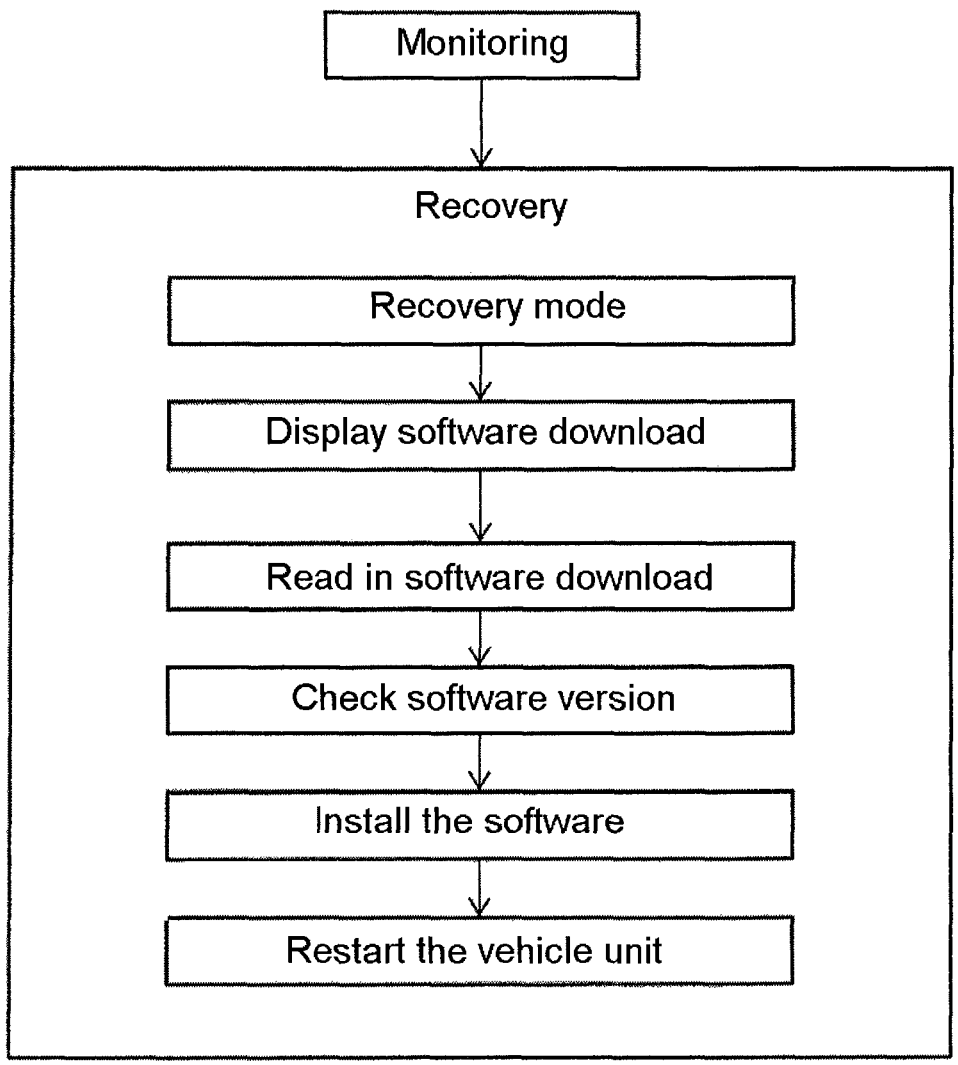
FIG. 2: shows a schematic process for operating a vehicle unit according to the present invention.

The method according to the invention is described below using the schematic method sequence, i.e., flow chart, according to FIG. 2.

During the starting up of the vehicle unit, a monitoring program runs in the supervision unit in partition 2 in order to detect errors in the main operating system. For this purpose, the supervision unit monitors the starting of the main operating system with regard to certain detailed functions. These detailed functions comprise important service functions and states of the main operating system.

These important states and functions concern, on the one hand, basic user interaction via a human machine interface (HMI) controlled via the main operating system. For this purpose, the function of the human machine interface is checked by the supervision unit, for example using a feigned input. If the human machine interface is not ready for use after a predefined time when starting the vehicle unit, this can be deemed to be an error in the main operating system.

In addition, partition 1 for the main operating system may be considered to be defective if an unusual load on the computing power of the processor or an unusual storage space requirement is detected. Excessive network traffic between the individual partitions of the separation kernel can also be deemed to be a feature of a defective main operating system.

If an error in the main operating system is detected, recovery is initiated. During this recovery, the monitoring unit starts a recovery mode in which partition 1 with the main operating system unit is completely switched off and unloaded from the microkernel architecture. Within the scope of an emergency operating system, the supervision unit then undertakes the remaining functions of the vehicle unit, also including, in particular, the response of the human machine interface.

The supervision unit thus outputs an error message to the end user via a screen of the human machine interface. An Internet link, in particular a https link, with some details such as the serial number or a version identification number, is output on the same screen on which the error message is displayed, with the result that the end user can download a current software package for the main operating system and/or the application software required by the latter from the Internet from a service page belonging to the manufacturer of the vehicle unit.

The software download can be carried out from a conventional PC onto an external storage medium, for example a USB memory stick. In order to be able to read in this software download, the supervision unit activates the drivers needed for external interfaces for the connection of external storage media in the emergency operating system. If the emergency operating system detects such an external storage medium at an interface during restarting of the vehicle unit, for example, its file system is searched for a software update package. As soon as such a package is detected, the hash value of the package is calculated, a corresponding signature is read and the encrypted software version and the hardware compatibility of the package are read from the storage device and transmitted to partition 4 with the cryptographic unit. The cryptographic unit checks the contents of the software package and provides the monitoring unit with feedback regarding whether the software package is admissible for the present hardware. The cryptographic unit can also decrypt the software in packages and provide it for installation.

If the software package is valid for the hardware, the supervision unit carries out a complete check of the blocks of the flash partitions which are used for the main operating system. It then starts reinstallation of the flash partition containing the main operating system (flashing). After successful installation in partition 1 for the main operating system unit, the vehicle unit starts with the new operating system the next time it is started. In addition to error handling, this also makes it possible to install targeted updates which can be initiated, for example, by means of a user input in the main operating system.

Instead of stating only the link address for the software download, it is also possible according to the invention for the supervision unit to store a link, which can be called on the Internet and already contains the necessary details for identifying the appropriate and required software, on a storage device connected to the vehicle unit. This avoids incorrect inputs.

The microkernel architecture according to the invention can therefore be used to carry out a method for operating the vehicle unit, which method can be controlled by the user and, in the event of a software error, allows the unit to be recovered without the latter having to be removed and sent to a special service point.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A vehicle unit for controlling vehicle functions, comprising:
   a microprocessor (20); and
   a memory (10), connected to the microprocessor, on which a main operating system is implemented, the main operating system forming an interface between hardware and application programs and user interactions,
   wherein the microprocessor is configured in a microkernel architecture with separate partitions for a main operating system unit (1), a cryptographic unit (4) and a supervision unit (2), wherein the main operating system is configured in the main operating system unit (1), software certificates are stored in the cryptographic unit (4), and a verification program, configured to verify certificates and software packages being set up in the cryptographic unit (4), and a monitoring program, configured to monitor the function of the other partitions of the microkernel architecture, are provided in the supervision unit (2), and wherein the supervision unit (2) is configured to initiate a recovery method for the partition with the main operating system, in the event of an error in the main operating system, using the monitoring program.

2. The vehicle unit as claimed in claim 1, wherein the partition with the main operating system unit (1) is configured to be changeable by an end user.

3. The vehicle unit as claimed in claim 2, wherein partitions other than the partition with the main operating system unit (1) of the microkernel architecture in the microprocessor are configured not to be changeable by the end user.

4. The vehicle unit as claimed in claim 1, wherein the cryptographic unit (4) is configured to decrypt and/or verify software to be installed in the vehicle unit in packages using the verification program.

5. The vehicle unit as claimed in claim 1, wherein the microkernel architecture is in the form of a separation kernel with a separate partition for a policy unit (3), the policy unit (3) being configured to monitor communication between the individual partitions of the microkernel architecture.

6. A method for operating the vehicle unit with a microprocessor as claimed in claim 1, on which a microkernel architecture with separate partitions for a main operating system unit (1), a cryptographic unit (4) and a supervision unit (2) has been set up, the main operating system being set up in the main operating system unit (1), software certificates being stored in the cryptographic unit (4) and a verification program for verifying certificates and complete software packages being set up in the cryptographic unit (4), and a monitoring program for monitoring the function of the other partitions of the microkernel architecture being provided in the supervision unit (2), the method comprising the monitoring program in the supervision unit (2):

monitoring the main operating system during starting and/or operation; and initiating a recovery method for the partition with the main operating system in the event of an error in the main operating system, using the monitoring program.

7. The method as claimed in claim 6, wherein, a determination of deviations during starting and/or operation of the main operating system is made based upon a monitoring of a typical start time for a user interface, the computation time of the microprocessor used by the main operating system and/or the storage space requirement used by the main operating system.

8. The method as claimed in claim 6, wherein, during the recovery method, the partition with the main operating system unit is switched off and is unloaded from the microkernel architecture.

9. The method as claimed in claim 6, wherein, during the recovery method, a backup image of the partition for the main operating system stored in the vehicle unit is written back.

10. The method as claimed in claim 6, wherein, during the recovery method, a user-interactive download of a current main operating system version is carried out, the current main operating system version being read in, in particular via an external storage medium, and being installed in the partition for the main operating system.

11. The method as claimed in claim 6, wherein the cryptographic unit (4) carries out a check before or during the installation of the main operating system.

12. A non-transitory computer-readable medium storing computer program code that, when executed by the computation unit, causes the vehicle unit to perform the method as claimed in claim 6.

\* \* \* \* \*